US011016005B2

(12) United States Patent
Bovée

(10) Patent No.: US 11,016,005 B2
(45) Date of Patent: May 25, 2021

(54) CUTTING SYSTEM, A SYSTEM FOR OBTAINING A SAMPLE OF PLANT MATERIAL COMPRISING THE SAME, AND METHOD

(71) Applicant: Rijk Zwaan Zaadteelt en Zaadhandel B.V., De Lier (NL)

(72) Inventor: Adrianus Johannes Cornelis Bovée, Oud Gastel (NL)

(73) Assignee: RIJK ZWAAN ZAADTEELT EN ZAADHANDEL B.V.

( * ) Notice: Subject to any disclaimer, the term of this patent is extended or adjusted under 35 U.S.C. 154(b) by 792 days.

(21) Appl. No.: 15/301,548

(22) PCT Filed: Apr. 2, 2015

(86) PCT No.: PCT/NL2015/050215
§ 371 (c)(1),
(2) Date: Oct. 3, 2016

(87) PCT Pub. No.: WO2015/152723
PCT Pub. Date: Oct. 8, 2015

(65) Prior Publication Data
US 2017/0030808 A1    Feb. 2, 2017

(30) Foreign Application Priority Data
Apr. 3, 2014   (NL) .................................... 2012565

(51) Int. Cl.
*G01N 1/04* (2006.01)
*G01N 1/08* (2006.01)
*G01N 1/28* (2006.01)

(52) U.S. Cl.
CPC .............. *G01N 1/08* (2013.01); *G01N 1/286* (2013.01); *G01N 2001/288* (2013.01); *G01N 2001/2873* (2013.01)

(58) Field of Classification Search
CPC .. G01N 1/08; G01N 1/286; G01N 2001/2873; G01N 2001/288; G01N 1/2873
See application file for complete search history.

(56) References Cited

U.S. PATENT DOCUMENTS 1,353,526 A *  9/1920  Frengle ................. B26F 1/3846
                                                       83/471.1
2,209,349 A *  7/1940  Peterson .................. A24C 1/04
                                                          83/512

(Continued)

FOREIGN PATENT DOCUMENTS

DE         10011235 A1    9/2001
WO     WO2010130304 A1   11/2010

OTHER PUBLICATIONS

Visionplusplus Belgium: "Vision++ 3D random bin picking of metal objects with stäubli robot", Jun. 29, 2009, XP054975617, Retrieved from the Internet: URL:https://www.youtube.com/watch?v=BwiHZvXOQ9M#t=46 [retrieved on Nov. 25, 2014].

*Primary Examiner* — Lisa M Caputo
*Assistant Examiner* — Alex T Devito
(74) *Attorney, Agent, or Firm* — Dechert LLP; Andrew T. Wilkins; Robin L. Brese

(57) ABSTRACT

The present invention is related to a cutting system. It is further related to a system for obtaining a sample of plant material and method. Such a system can for instance be used for DNA analysis as part of a plant breeding program. According to the invention, the cutting system comprises a cutting device having a hollow cutting element having a cutting edge facing a leaf of a plant to be sampled, a drive unit for rotating said cutting element about a longitudinal axis of said cutting element to cut through the leaf, and a gas flow direction unit for applying a suction force through the hollow cutting element. The cutting system further comprises a control unit for controlling the drive unit and the gas (Continued)

flow direction unit. According to the invention, the hollow cutting element is elongated and the control unit is configured to control the gas flow direction unit and the drive unit such that said suction force is applied during said cutting through the leaf, and preferably at least prior to said cutting through the leaf.

24 Claims, 9 Drawing Sheets

(56) References Cited

U.S. PATENT DOCUMENTS

| | | | | | |
|---|---|---|---|---|---|
| 2,706,984 | A | * | 4/1955 | Lipari | A61M 5/28 604/200 |
| 3,191,473 | A | * | 6/1965 | Maas | A24C 1/04 83/98 |
| 3,714,681 | A | * | 2/1973 | Van Snellenberg | A22C 25/00 452/116 |
| 3,930,505 | A | * | 1/1976 | Wallach | A61F 9/00736 604/22 |
| 4,960,025 | A | * | 10/1990 | Fitch | A21C 9/04 83/409.2 |
| 5,131,191 | A | * | 7/1992 | Mayahara | B24B 13/005 451/24 |
| 2005/0044971 | A1 | | 3/2005 | Harris | |
| 2016/0091400 | A1 | * | 3/2016 | Whited | G01N 1/06 435/40.52 |

* cited by examiner

CUTTING SYSTEM, A SYSTEM FOR OBTAINING A SAMPLE OF PLANT MATERIAL COMPRISING THE SAME, AND METHOD

The present invention is related to a cutting system. It is further related to a system for obtaining a sample of plant material and method. Such a system can for instance be used for DNA analysis as part of a plant breeding program. An example of such a device is known from U.S. Pat. No. 7,980,148.

The known device uses a punch rod to punch a sample out off a leaf of a plant. Prior to the punching operation, the leaf has to be inserted in an opening between the punch rod and a supporting element. The latter element is required to avoid that the leaf moves away during the punching process.

With the known device, a user has to manually manipulate the device in order for the leaf to be inserted in the opening defined between the punch rod and supporting element. This prevents the device to be used in fully automated sampling systems.

An increasing trend in plant breeding is to use DNA sampling to predict or analyze plant properties using samples from relatively young plants, such as seedlings. This allows the identification of interesting or desired plants at an early stage. These plants may then be used for further crossing and selection steps.

A cutting system as defined by the preamble of claim 1 is known from WO 2010/130304. This system comprises a cutting device having a hollow cutting element with a cutting edge, a drive unit for rotating the cutting element about a longitudinal axis of the cutting element, and a gas flow direction unit for applying a suction force through the hollow cutting element. The system further comprises a control unit for controlling the drive unit and the gas flow direction unit.

The known cutting system is used for the automated separation of fatty tissue from a remaining part of tissue. To this end, a piece of tissue is placed on a support in the form of a bottom plate. Then, the cutting device is placed above the tissue. This device comprises a sleeve having an inner plunger which is moved downward such that the tissue is pressed in between the plunger and the bottom plate. Alternatively, a pneumatic pressure may be generated in the sleeve to press the tissue against the bottom plate. Due to the applied pressure, the fatty tissue comprised in the tissue will be pressed outwardly through a gap between the bottom plate and the sleeve. Thereafter, the cutting element, which is in the form of a cutting ring arranged coaxially around the sleeve, is moved downward to engage the tissue. The cutting ring rotates to cut through the tissue thereby separating the fatty tissue from the remaining part of the tissue. After the fatty tissue is cut away, a reduced pressure is created in the sleeve for holding the remaining part of the tissue in the sleeve such that it can be transported for further processing.

Manually sampling plants for DNA analysis requires an enormous effort on the part of the plant breeder due to the large number of plants typically involved in a plant breeding process. It is therefore desired to automate the sampling process. Unfortunately, it has been found that such automation cannot be achieved using the known systems described above.

It is therefore an object of the present invention to provide a system which allows samples of plant material to be obtained in a more automated manner. More in particular, it is an object of the present invention to provide a cutting system that is capable of sampling plants which are transported, for instance on a conveyer belt, prior to or during the sampling process.

According to a first aspect, this object is achieved with a cutting system that is characterized in that the hollow cutting element is elongated and in that the control unit is configured to control the gas flow direction unit and the drive unit such that the suction force is applied during the cutting through the leaf, and preferably at least prior to said cutting through the leaf.

The applicant has realized that a problem for automating the sampling of a large number of plants is related to the motion of leafs that is caused by the transportation of the plants. The known devices require the leaf of the plant to be inserted in an opening between a punch rod or plunger and a supporting element. This process is very difficult to automate even for leafs that are only slightly moving.

The cutting system according to the invention allows a cutting action to be achieved, by means of the rotation of the hollow cutting element, while at the same time applying a suction force to the leaf to be sampled. The suction force attracts the leaf towards the cutting element. As a result, the supporting elements of the known devices are no longer required and it becomes possible to sample a plant by means of interaction from one side of the leaf of the plant only. Because the operation of the device does not rely on the positioning of the leaf in a relatively narrow opening, it can be used even in situations where leafs are moving. The system can therefore be used in applications where a large number of plants need to be analyzed.

The suction force is applied during the cutting through the leaf. Preferably, the suction force is the dominant force, even more preferably the only force, pulling the leaf against the cutting element during the cutting. To this end, the suction force is preferably applied prior to the cutting.

The hollow cutting element can for instance be formed using a hollow cylinder like body having a sharp edge. The element can be integrally formed from a single material. However, embodiments in which the cutting edge is formed from a different material are not excluded. In such embodiments, the material properties for the cutting action can be optimized if desired.

The gas flow direction unit causes a flow of gas through the inside of the hollow cutting element. Depending on the direction of the gas flow, a pushing or suction force may be generated. The gas flow direction unit is preferably configured to be able to generate both the pushing and suction force, depending on the action that is desired. The pushing force through the hollow cutting element can be used to push a cut sample of the leaf away from the cutting device. Hence, the gas flow direction unit is preferably used to attract a leaf prior to cutting, and to push away a cut sample after cutting. To this end, the gas flow direction unit may comprise a vacuum unit for generating the suction force and/or a pressurized gas source for generating the pushing force.

The gas direction unit may further comprise a valve unit which allows a switching between the pressurized gas source and the vacuum unit to change between an application of the suction force and the pushing force. The control unit may be configured to control the valve unit or the valve unit can be operated manually. In either case, the suction force can be selected prior to cutting, and then, after a sample has been obtained, it can be maintained to keep the sample attached to the cutting device while the device is moved to a container. Here, application of the pushing force can be selected to push the sample into the container for further processing.

The cutting device may further comprise an elongated hollow suction element, arranged inside the hollow cutting element, through which said suction force is applied. The suction element allows the application of the suction force and the cutting action of the cutting element to be separated. This can be improved when the hollow cutting element and the hollow suction element are arranged coaxially, and if the hollow cutting element and the hollow suction element are mutually displaceable along their longitudinal axes. For instance, a leaf may be first sucked against the suction element, after which the cutting element is moved for engaging and cutting the leaf. In such embodiment, it is possible to only start rotating the cutting element when the leaf is properly sucked against the suction element.

The cutting device may further comprise a mounting frame on which the hollow cutting element and the hollow suction element are arranged. The hollow suction element is preferably rotationally fixed relative to the mounting frame, and the hollow cutting element is preferably rotationally mounted on the mounting frame. The drive unit may be arranged spaced apart from the hollow cutting element. A transmission, such as a belt, between the drive unit and the hollow cutting element can be used to allow the drive unit to rotate the hollow cutting element.

The cutting device may comprise a second drive unit mounted on the mounting frame and being configured to displace the hollow cutting element along its longitudinal axis with respect to the mounting frame between a first free position, in which it does not significantly engage the leaf, to a second position in which the hollow cutting element is able to engage the leaf. For instance, when the cutting device is positioned to engage a leaf from above, the hollow cutting element may, in the first position, be arranged upwards relative to the suction element in such a manner that the cutting element does not significantly engage the leaf when it is sucked against the suction element. The control unit may be configured to control the second drive unit. For instance, the control unit may be configured to first control the gas flow direction unit to apply the suction force to attract the leaf against the hollow suction element and to then control the second drive unit to displace the hollow cutting element relative to the hollow suction element from the first position to the second position in order to engage the leaf that has been sucked against the hollow suction element and to cut through the leaf. In this manner, the positioning of the leaf prior to the cutting process can be performed accurately, without being disturbed by interactions between the leaf and the cutting element. Preferably, the control unit is configured to control the drive unit to start rotating the hollow cutting element prior to the hollow cutting element reaching the second position. This prevents that frictional forces between the cutting element and the leaf at relatively low angular velocities cause the leaf to be disengaged from the suction element.

The cutting device may further comprise a third drive unit mounted on the mounting frame and being configured to displace the hollow suction element along its longitudinal axis with respect to the mounting frame. Furthermore, the control unit may be configured to control the third drive unit. For instance, the control unit may be configured to, after the leaf has been cut, control the third drive unit to displace the hollow suction element relative to the hollow cutting element and to then control the gas flow direction unit to apply the pushing force to push the cut sample of the leaf away from the device. For example, the cutting element and the suction element may be oriented downwardly. In this situation, the suction element may be moved downward relative to the cutting element such that an end of the suction element, onto which the sample of the leaf is being held by the suction force, moves away from the cutting element. This allows the sample of the leaf to be transported and deposited in relatively narrow openings, such as a vessel.

In an embodiment, the cutting device further comprises a main body having a cavity in which the hollow cutting element is rotatably received. The drive unit is connected to the main body, and comprises an output shaft that is connected to the hollow cutting element. The output shaft may extend through the hollow cutting element. It may be connected to the hollow cutting element by means of screws or the like or its connection may be based fully on friction.

In an embodiment, the gas flow direction unit comprises a conduit which is in fluid communication with the hollow cutting element. Hence, gas may flow between the conduit and the inside of the hollow cutting element. Furthermore, the main body may comprise an opening which is in fluid communication with the cavity and to which opening the conduit is connected, wherein the hollow cutting element comprises one or more openings to enable the fluid communication between the conduit and the hollow cutting element. In a further embodiment, the main body and/or the hollow cutting element may comprise a radial recess at or near the one or more openings for defining a chamber that extends around the hollow cutting element and which is in fluid communication with said conduit. In this manner a ring shaped chamber may be formed which allows a fluid communication between the conduit and the inside of the hollow cutting element regardless of the angular position of the hollow cutting element in the main body.

The cutting device may be provided with a support element arranged near an end of the cutting element that faces the leaf and having a supporting surface perpendicular to the longitudinal axis, wherein the supporting surface has an opening through which the hollow cutting element extends. The supporting surface may support a leaf during the cutting process. Furthermore, the support element may be adjustably connected to the main body, wherein a distance between the main body and the support element can be adjusted. In this manner, the length of the part of the hollow cutting element that extends through the opening in the supporting surface can be adjusted and can be optimized with respect to for instance the thickness and/or strength of the leafs to be sampled.

To prevent the cut sample to be sucked through the hollow cutting element it is advantageous if the hollow cutting element is provided with a plurality of separated channels formed near the cutting edge. The walls in between the separated channels prevent, or at least limit to a large extent, the risk of a cut sample to fully enter into the hollow cutting element.

The cutting device may further comprise a pressure sensor to measure pressure in the gas flow direction unit related to the suction force, wherein the control unit is configured to determine that a sample of a leaf has been obtained and/or that a leaf has been sucked against the hollow suction tube if the measured pressure drops below a predetermined threshold value, wherein the control unit is configured to control the hollow cutting element and/or the second drive unit in dependence of the determination. For instance, in case a cutting element is used without the abovementioned suction element, it can be determined that a sample has not been properly obtained if the pressure increases too much after cutting. This would indicate that the opening of the cutting element is no longer blocked by a sample of the leaf. Similarly, if both a suction and cutting element are used, the pressure inside the suction element is indicative for whether the opening of the suction element is blocked by a sample of the leaf. If a pressure drop is not detected, the system may re-try to obtain a sample from the same leaf, it may try a different leaf from the same plant, or it may disregard the plant altogether.

The cutting device may further comprise a pressure sensor to measure pressure in the gas flow direction unit related to the pushing force, wherein the control unit is configured to determine that the cut sample obstructs the hollow cutting element and/or the hollow suction tube when the measured pressure does not drop below a predetermined threshold value after application of the pushing force. If the pressure drop is not detected, the control unit may control a robot arm on which the cutting device is mounted to move to a dedicated unit to clean the cutting device or it may generate a warning signal for a user. The same pressure sensor may be used for measuring pressure in the gas flow direction unit related to the pushing force and to the suction force.

According to a second aspect, an object of the invention has been achieved with a system for obtaining samples of plant material that comprises a robot arm, the cutting system as described above, wherein the cutting device is mounted on an end of the robot arm. The system further comprises one or more cameras for obtaining an image of the leaf to be sampled, an image processing unit to process the obtained image. The control unit of the cutting device may be further configured for controlling the movement of the robot arm. The control unit may also be configured to control the orientation and position of the robot arm depending on the processed image.

It should be noted that the control unit of the cutting system is normally separated from the cutting device. In the abovementioned system for obtaining samples of plant material, a single control unit can be used that controls both the robot arm and the cutting device. Alternatively, a control system is used that comprises different control units that cooperate to provide the same functionality.

The system according to the invention allows for the automated sampling of a large number of plants because it does not rely on the accurate placement of potentially moving leafs in a relatively narrow opening between a support element and the cutting element.

The image processing unit may be configured to obtain information regarding the position and orientation of the leaf to be sampled and to determine the corresponding desired position and orientation of the robot arm. Using more cameras or other means of characterizing or imaging the leaf to be sampled, the orientation and position of the leaf to be sampled can be determined in three dimensional space. This information can then be used to control the robot arm and the cutting device mounted thereon.

If the cutting device comprises a valve unit as described earlier, and if this valve unit can be controlled, e.g. in an electronic manner, the control unit may be configured to first control the valve unit to apply a suction force, move the robot arm to a position wherein the device may obtain a sample from the plant, and control the drive unit to rotate the cutting element, and to then move the robot arm away from said position and apply a pushing force to push the cut sample away from the device into a container. It should be noted that the invention does not exclude embodiments wherein the hollow cutting element keeps rotating after having cut a sample from the leaf nor does it exclude embodiments wherein the hollow cutting element stops rotating after a sample has been cut. Furthermore, the application of the suction force may be postponed to the actual cutting process. It may also be possible for the valve unit to switch to a neutral state in which no considerable force is exerted onto the leaf.

According to a third aspect, an object of the invention has been achieved with a method for obtaining a sample of plant material that comprises the steps of a) providing an elongated hollow cutting element, b) positioning the cutting element in the vicinity of a leaf of a plant, c) applying a suction force through the elongated hollow cutting element to attract the leaf towards the elongated hollow cutting element, and d) rotating the hollow cutting element to cut through the leaf while maintaining the suction force. The method of the invention allows for a sample to be obtained without the requirement of performing actions on both sides of a leaf.

A hollow suction element may be arranged inside the hollow cutting element. In this case, step c) may comprise applying the suction force through the hollow suction element. Additionally or alternatively, step d) may comprise rotating the hollow cutting element to cut through the leaf while keeping the leaf sucked against the hollow suction element using the suction force.

The hollow cutting element may be initially positioned in a first free position in which it does not significantly engage the leaf that has been sucked against the hollow suction tube. In this case, step d) may further comprise moving the hollow cutting element relative to the hollow suction element from the first position to a second position for engaging and cutting the leaf.

The method may further comprise displacing the hollow suction element relative to the hollow cutting element, and supplying a pressurized gas to the hollow suction element for generating a pushing force to push the cut sample of the leaf away from the hollow suction element.

Alternatively, and in the case without a hollow suction element, step d) may comprise rotating the hollow cutting element to cut through the leaf while keeping the leaf sucked against the hollow cutting element using the suction force. The cutting element preferably rotates before it engages the leaf.

Next, the invention will be described in more detail under reference to the appended drawings, wherein.

Figure 1:
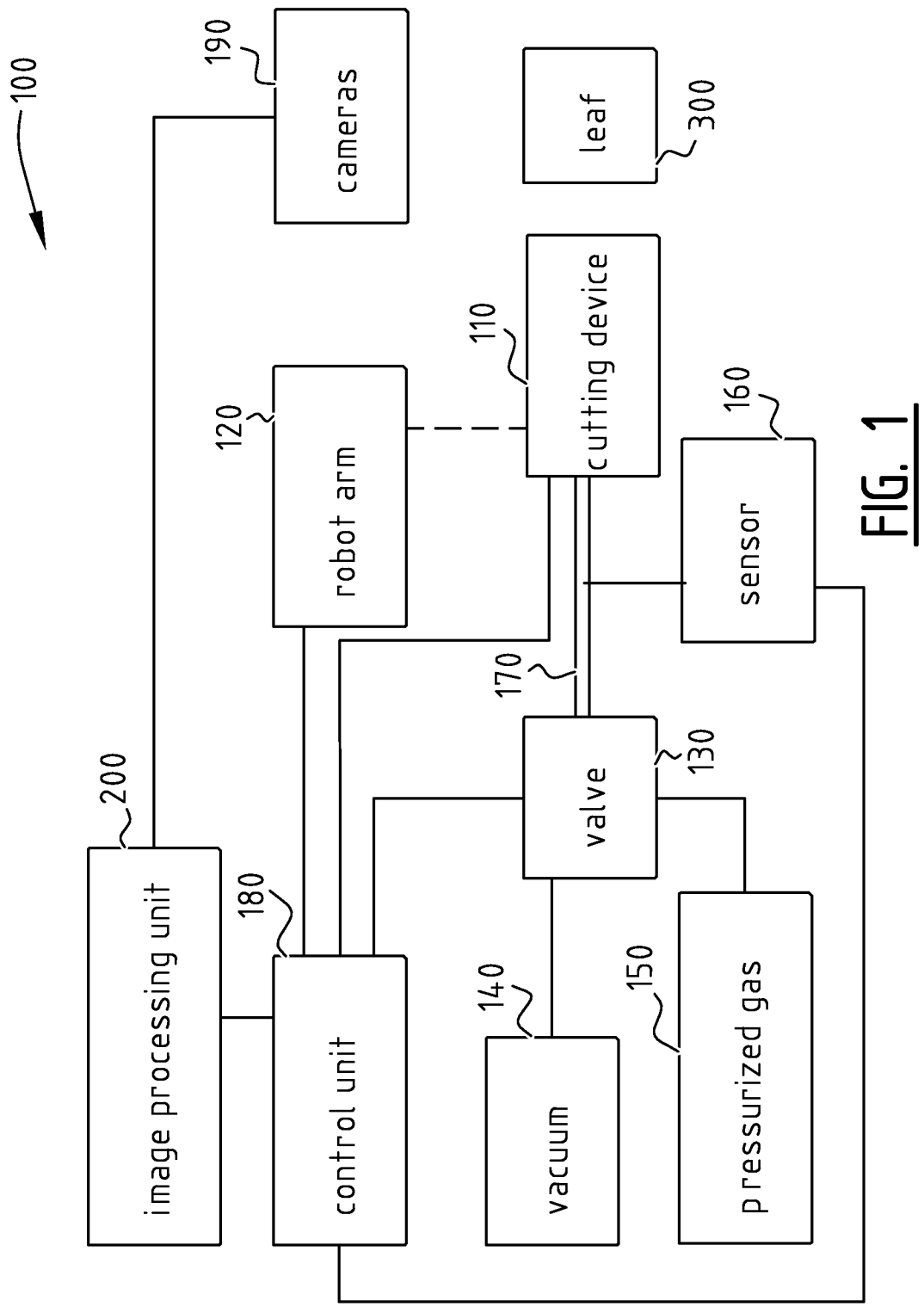
FIG. 1 illustrates an embodiment of a system for obtaining samples of plant material according to the present invention.

FIG. 1 illustrates a system 100 in accordance with the present invention. It comprises a cutting device 110. It is connected to a robot arm 120 onto which cutting device 110 is mounted. A source of vacuum 140 and a source of pressurized gas 150 are employed to realize the suction force and pushing force, respectively. A valve unit 130 is used to switch between both sources. A sensor 160 is used to measure the pressure in conduit 170 between cutting device 110 and valve unit 130.

System 100 further comprises a control unit 180 to control the operation of robot arm 120, to control the switching operation of valve unit 130, and the control the drive unit of cutting device 110.

In addition, system 100 comprises one or more optical cameras 190 of which the outputted images are processed by an image processing unit 200. The output from image processing unit 200 is outputted to control unit 180.

An example operation of obtaining a sample from a leaf 300 using system 100 is elucidated next.

First, the position and orientation of leaf 300 are determined using cameras 190 and image processing unit 200. Known calibration techniques may be used to correlate the outputted images with position and orientation data for leaf 300 in real space.

Next, control unit 180 will control robot arm 120 to move such that cutting device 110 is brought into an appropriate position and orientation to cut a sample from leaf 300. Prior to cutting a sample, valve unit 130 is controlled such that a suction force is or keeps being applied using vacuum source 140. At this point in time, pressure sensor 160 may monitor the pressure in conduit 170. If this pressure is too low, the hollow cutting element of cutting device 110 may be obstructed. A corresponding warning signal may be generated for a user to interrupt the operation or the control unit may first control robot arm 120 to perform a cleaning process prior to repeating or resuming the abovementioned operation.

Control unit 180 will control the drive unit of cutting device 110 to ensure that a hollow cutting element comprised in cutting device 110 starts or keeps rotating. Hence, the hollow cutting element will rotate at high speeds, e.g. 3000 to 20000 rpm, and a suction force will be applied to leaf 300 simultaneously. Control unit 180 may control robot arm 120 to move towards leaf 300 to commence the cutting process and/or leaf 300 will move to cutting device 110 due to the suction force applied thereto. The suction force may also be applied before the cutting element starts to rotate.

Due to the relatively high rotational speed of the relatively sharp cutting edge of the cutting element of cutting device 110, a sample will be cut from leaf 300. This cut sample will attach to a wall portion of the hollow cutting element under the influence of the suction force.

As a next step, control unit 180 will control robot arm 120 such that cutting device 110 is brought to a position where it can deposit the cut sample. At the same time, control unit 180 may control the drive unit of cutting device 110 to stop the rotational motion of hollow cutting element, although this may not be necessary.

Once in an appropriate position, e.g. above a container, control unit 180 will control valve unit 130 to connect source 150 of pressurized gas to cutting device 110. As a result, a pushing force will be exerted on the cut sample. Accordingly, the cut sample will be pushed away from cutting device 110, for instance into a container.

The pressure in conduit 170 between valve unit 130 and cutting device 110 may be monitored using pressure sensor 170. If, after a predetermined amount of time, the pressure in conduit 170 is not below a predefined threshold value, it may be assumed that the cut sample keeps obstructing the hollow cutting element. Consequently, control unit 180 may control robot arm 120 to allow cutting device 110 to be cleaned. A new sample may be cut from the same leaf or a different leaf from the same plant. Alternatively, the plant in question is disregarded altogether.

After the cut sample is pushed away, a new plant may be processed.

If desired, the camera or cameras may further be configured to capture an identificator corresponding to the plant to be processed. For instance a barcode or other form of tagging may be provided to identify the plant to be characterized. Using this information, the control unit 180 may control the robot arm 120, cutting device 110 and valve unit 130 to deposit the cut sample in an appropriate container corresponding to the captures identificator.

Figure 2:
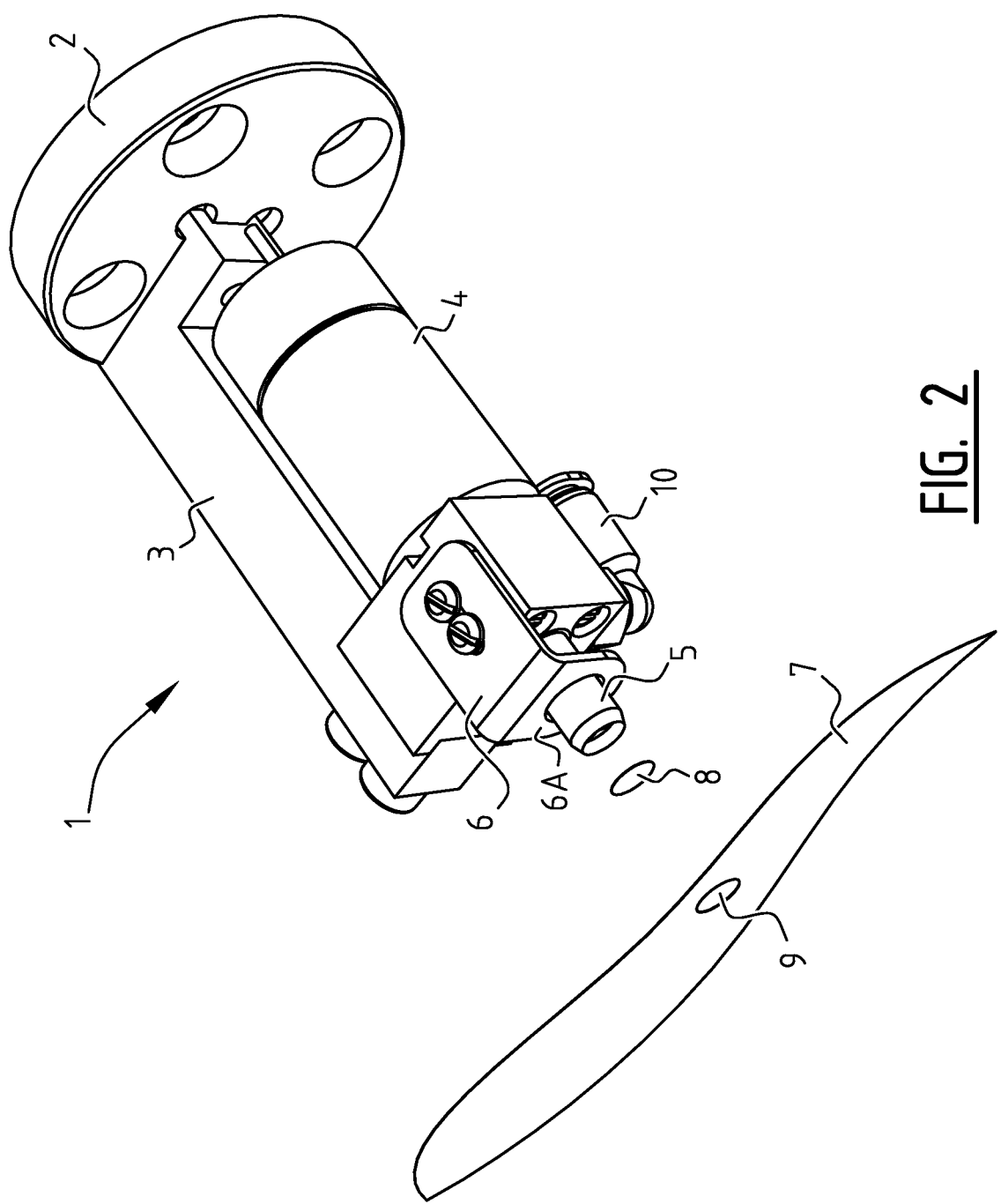
FIG. 2 illustrates an embodiment of a cutting device to be used in the system of FIG. 1 in accordance with the present invention.

In FIG. 2, a first embodiment of cutting device 1 that can be used in the system of FIG. 1 is displayed. It comprises a mounting flange 2 which is part of a main body 3. This flange may be used to connect device 1 to robot arm 120. A drive unit 4 which drives a hollow cutting element 5 is connected fixedly to main body 3. A supporting element 6 is mounted to main body 3. It provides a supporting surface 6A for a leaf 7 to be sampled.

Device 1 may be used to cut a sample 8 from a leaf 7, thereby leaving an opening 9 in leaf 7. To attract leaf 7 towards hollow cutting element 5, a suction force may be applied using a vacuum connected to an inlet 10 of device 1. Here, inlet 10 can be connected to valve unit 130 using conduit 170 as depicted in FIG. 1. The vacuum will be guided in the inside of hollow cutting element 5 towards leaf 7.

Figure 3:
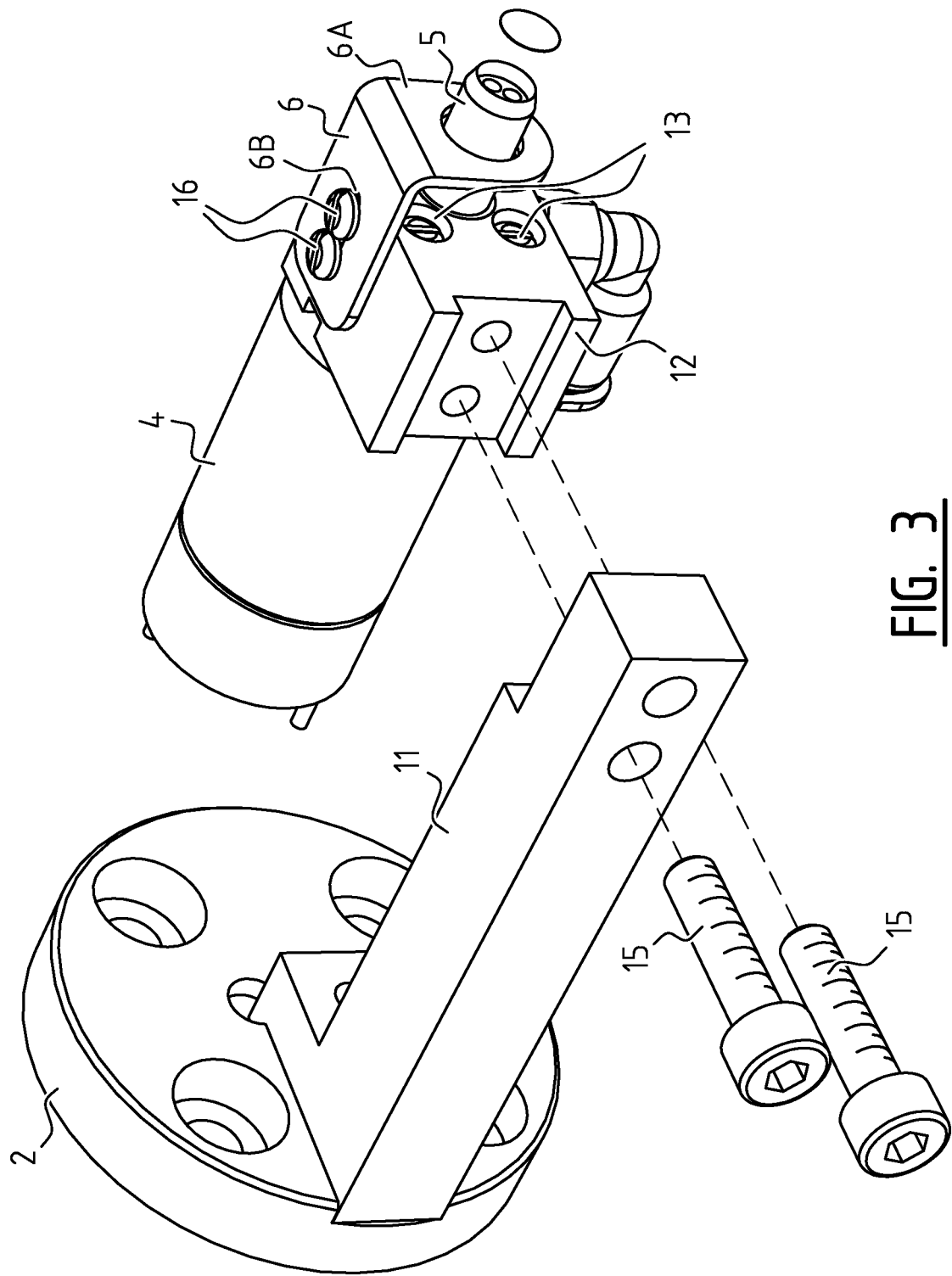
FIG. 3 illustrates the embodiment in FIG. 2 from a different viewpoint.

As shown in FIGS. 2 and 3, main body 3 further comprises a mounting arm 11 and a receiving block 12, wherein the mounting arm 11 is arranged between mounting flange 2 and receiving block 12. Hollow cutting element 5 is rotatably received in receiving block 12. Screws 13 are employed to fixedly connect receiving block 12 to drive unit 4, see FIG. 3. The latter may comprise corresponding holes 14 to accommodate screws 13. Similarly, mounting screws 15 are used to fixedly connect mounting arm 11 to receiving block 12. In addition, screws 16 may be used to fixedly connect supporting element 6 to receiving block 12. As can be seen in FIG. 2, hollow cutting element 5 extends through an opening of supporting surface 6A. The length of the part of hollow cutting element 5 that extends through the opening can be adjusted by loosening screws 16, which are arranged in a slot 6B in supporting element 6. Once loosened, supporting element 6 can be moved in a direction along the longitudinal axis of hollow cutting element 5.

Figure 4:
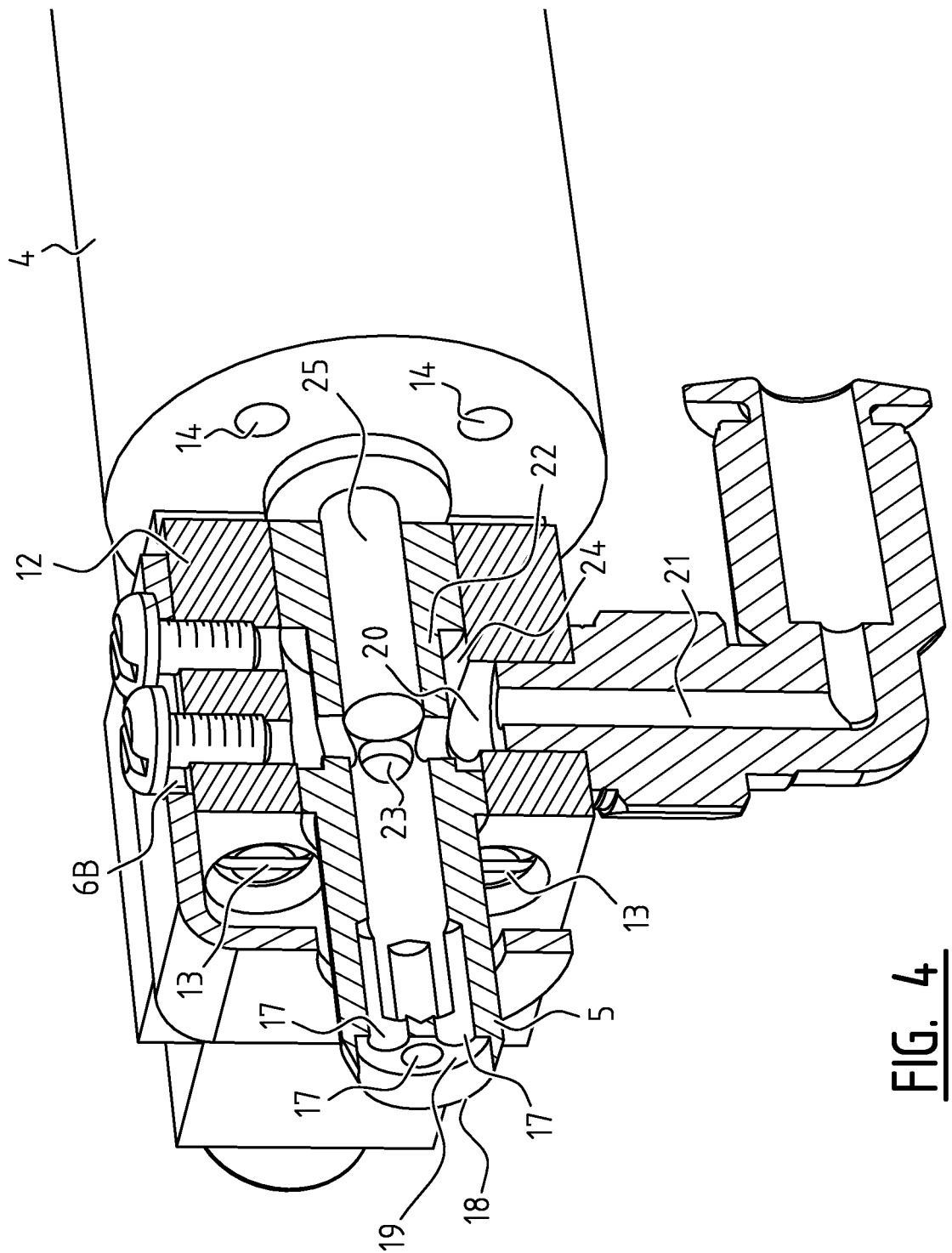
FIG. 4 illustrates a cross section of the embodiment in FIG. 2.

As shown in FIG. 4, hollow cutting element 5 comprises a plurality of separated channels 17 near its cutting edge 18. A wall portion 19 arranged in hollow cutting element 5 prevents or impedes a cut sample from entering hollow cutting element 5 too far.

Receiving block 12 comprises an opening 20 to which a conduit 21 is connected. At a corresponding location, hollow cutting element 5 comprises a radial recess 22 and radial openings 23. As a result, a ring shaped chamber 24 is formed which is fluid communication with conduit 21, and in fluid communication with the inside of hollow cutting element 5 through openings 23.

Cutting edge 18 of hollow cutting element 5 is formed by gradually reducing the wall thickness of hollow cutting element 5 until a desired sharpness is achieved. This portion of hollow cutting element 5 may be formed using a different material which is fixedly connected to the remainder of hollow cutting element 5. However, hollow cutting element 5 may be integrally formed from a single material such as stainless steel.

Drive unit 4 comprises an output shaft 25 which uses a frictional connection to couple with hollow cutting element 5. Additionally or alternatively, different means of coupling output shaft 25 to hollow cutting element 5 may be used, such as screws or the like.

In the embodiment of the cutting device shown in FIGS. 2-4, hollow cutting element 5 is preferably rotating before leaf 7 is sucked against thereto. As will be elucidated next, embodiments are possible within the scope of the present invention, wherein the hollow cutting element will start to rotate after the leaf has been attracted using the suction force.

Figure 5:
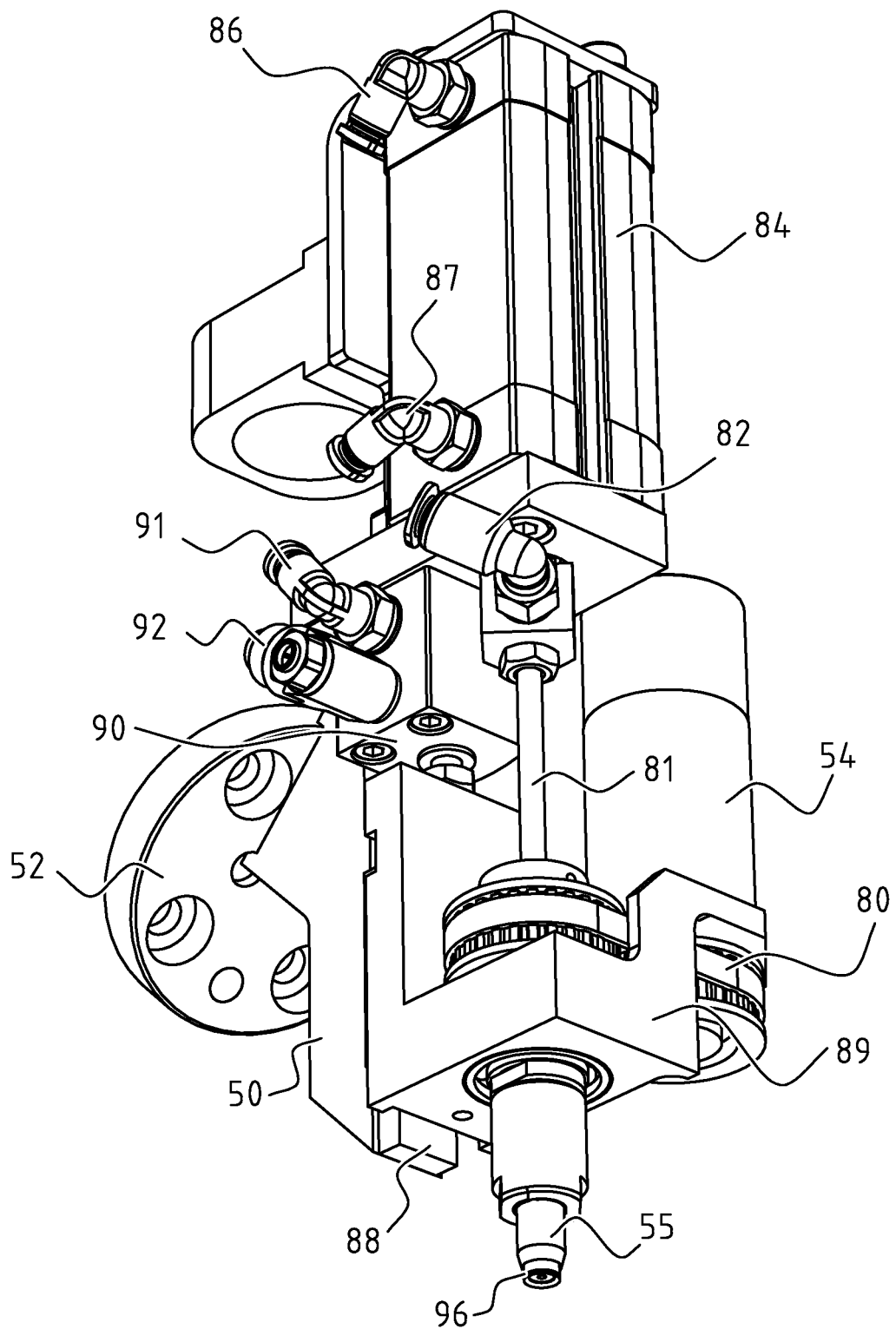
FIG. 5 illustrates a further embodiment of a cutting device to be used in the system of FIG. 1 in accordance with the present invention.
Figure 6:
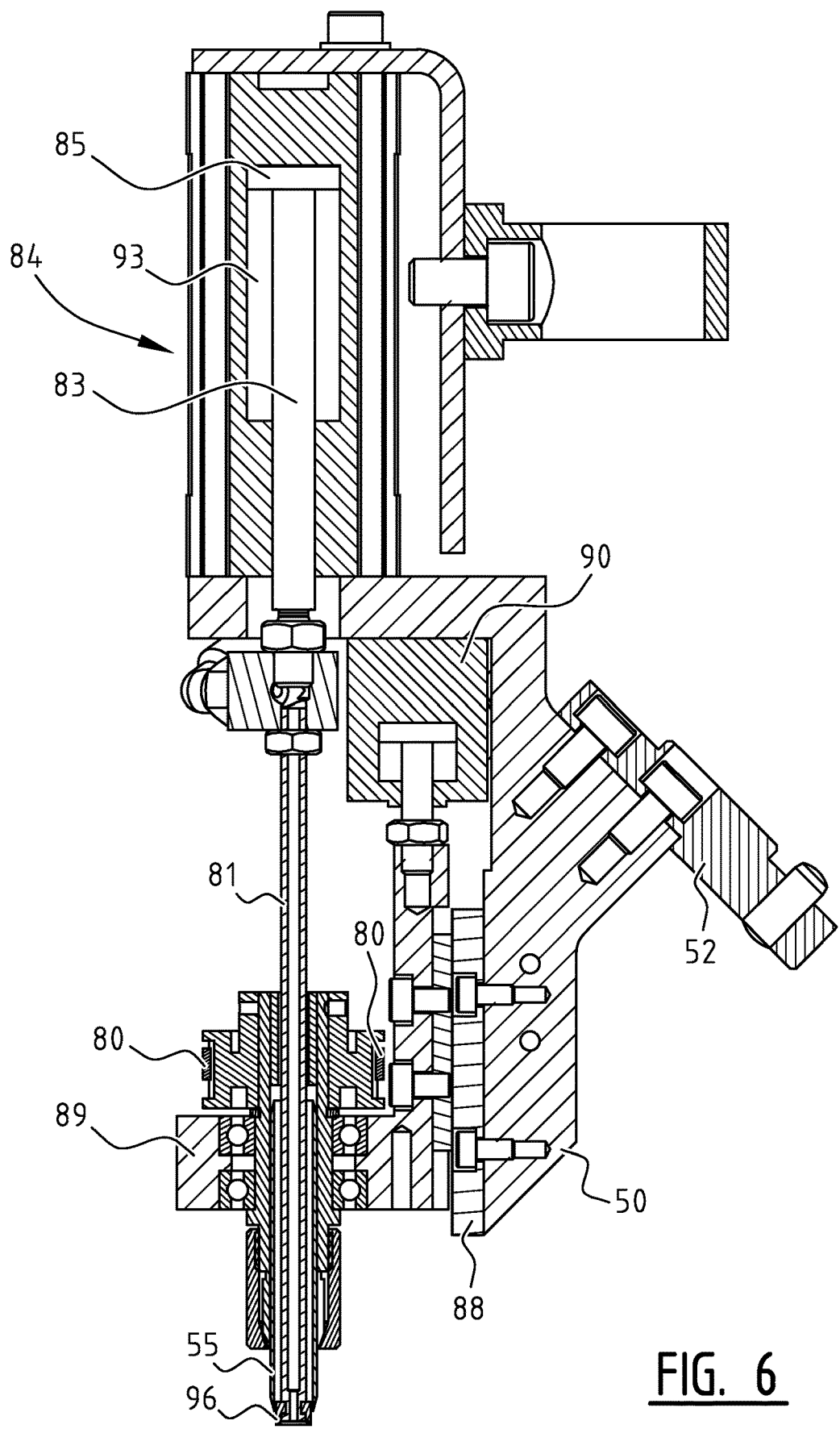
FIG. 6 illustrates a cross section of the embodiment of FIG. 5.

FIGS. 5-7 illustrate a second embodiment of a cutting device in accordance with the present invention. This embodiment comprises a mounting frame 50 that comprises a mounting flange 52 by which the cutting device can be mounted to a robot arm. The cutting device illustrated in FIG. 5 comprises a hollow cutting element 55 that is rotationally mounted relative to mounting frame 50. Hollow cutting element 55 can be driven, via a transmission 80, by a drive unit 54.

Hollow cutting element 55 is coaxially mounted relative to a hollow suction element 81. A resilient member 96 is mounted at an end of hollow suction element 81, see FIG. 6. This element is connected to an inlet 82 to enable pressure control inside hollow suction element 81. Hollow suction element 81 is connected to a piston rod 83 of a pneumatic cylinder 84, see FIG. 6. Piston rod 83 is connected to a piston 85 that is moveably arranged in a pressure chamber 93. By varying the pressure above and/or below piston 85, piston rod 83 can either move downward or upward. As illustrated in FIG. 5, pneumatic cylinder 84 is a double-acting cylinder comprising two inlets 86, 87 to control the extending and retracting stroke of piston rod 83.

Hollow suction element 81 is moveably arranged inside hollow cutting element 55. More in particular, it is capable of translating up and down inside hollow cutting element 55 when actuated by pneumatic cylinder 84. On the other hand, mounting frame 50 comprises a guiding bar 88 along which a carriage 89 can slide. Hollow cutting element 55 is rotationally mounted to carriage 89 whereas drive unit 54 is fixedly connected to carriage 89. The cutting device further comprises a second double-acting pneumatic cylinder 90, having two inlets 91, 92, for controlling the movement of carriage 89. When actuated by cylinder 90, carriage 89 is able to translate up and down. At the same time, hollow cutting element 55 will translate relative to hollow suction element 81.

Figure 7A:
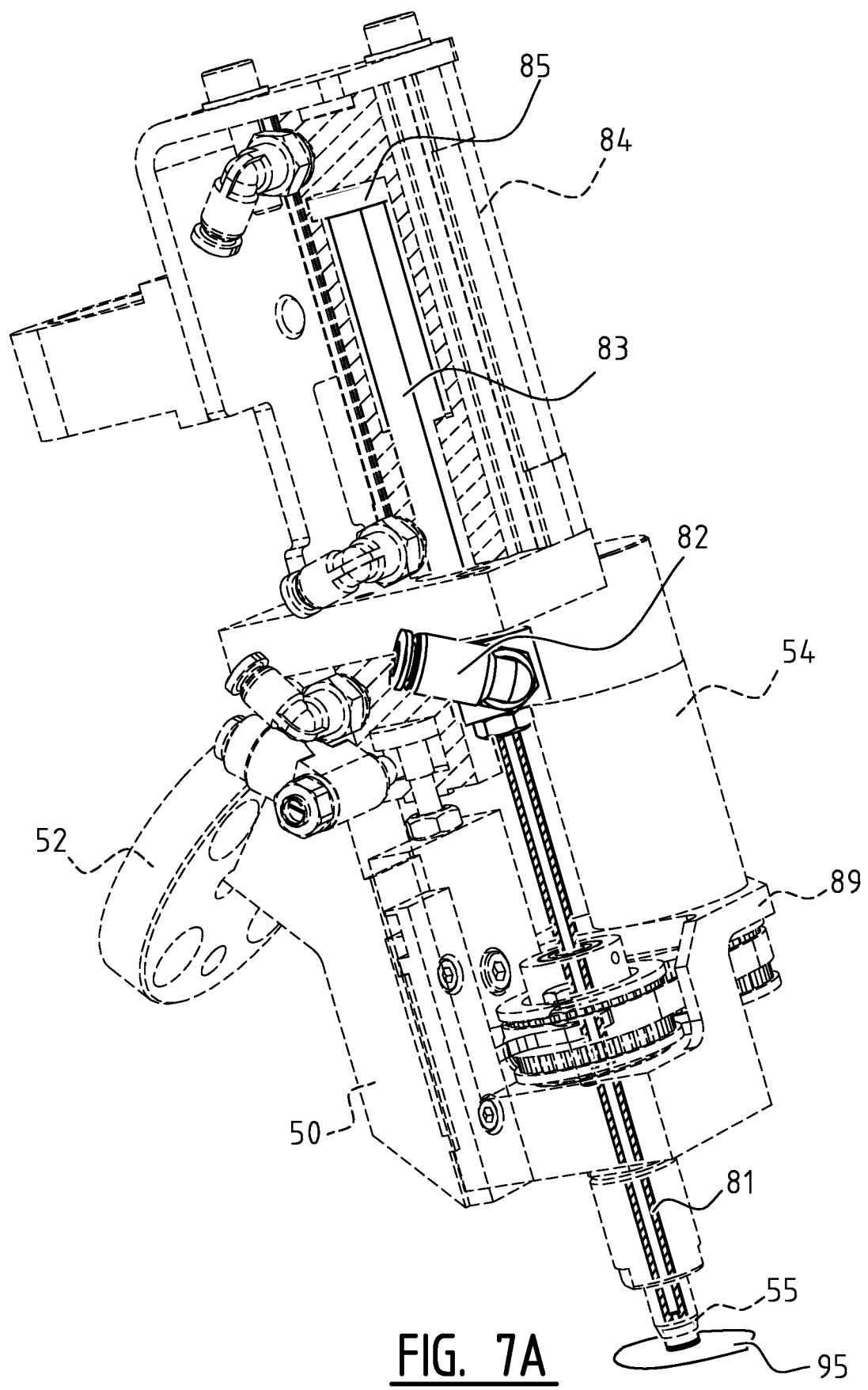
FIG. 7A-7C illustrate the embodiment of FIG. 5 in three different positions.
Figure 7B:
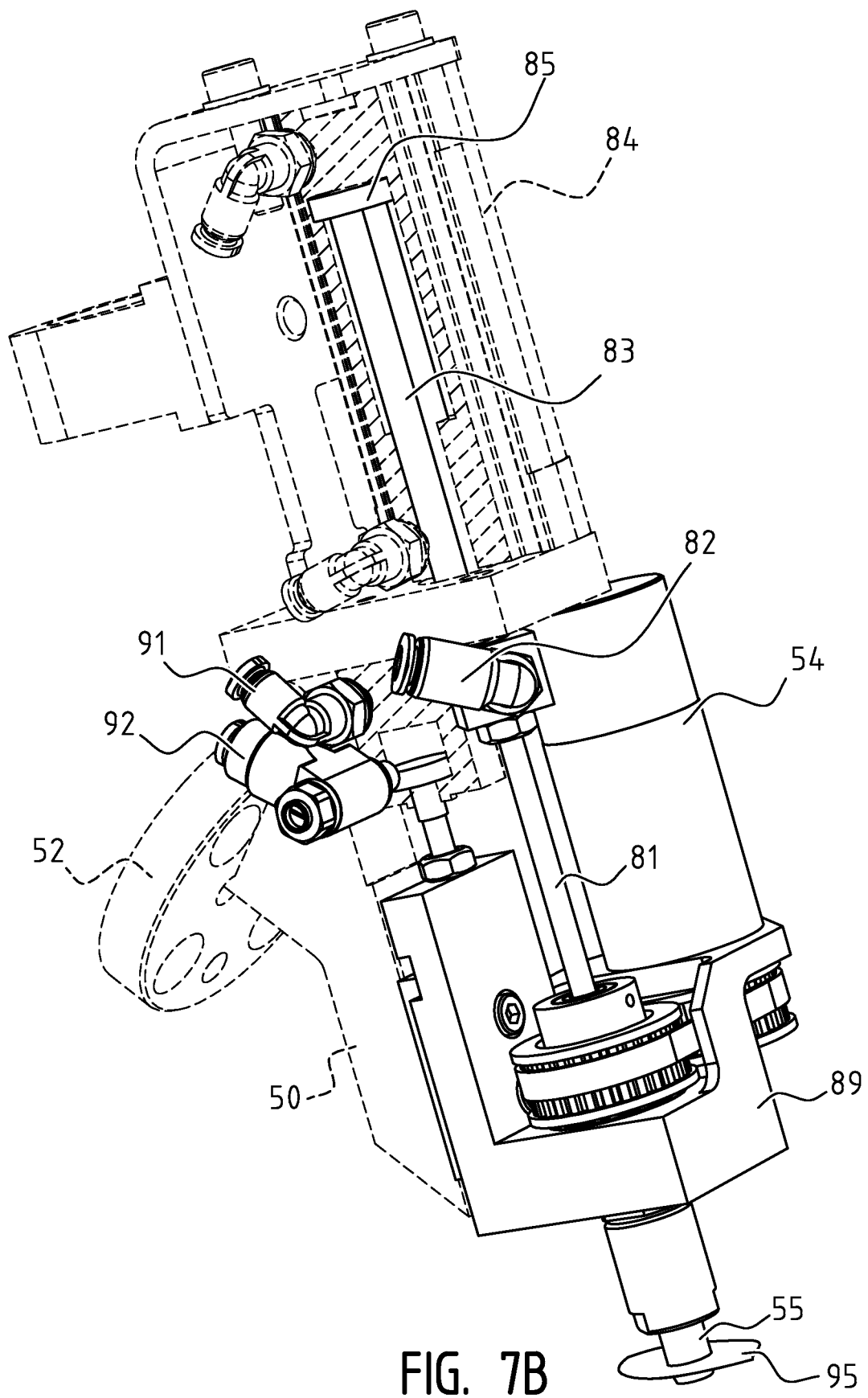
Figure 7C:
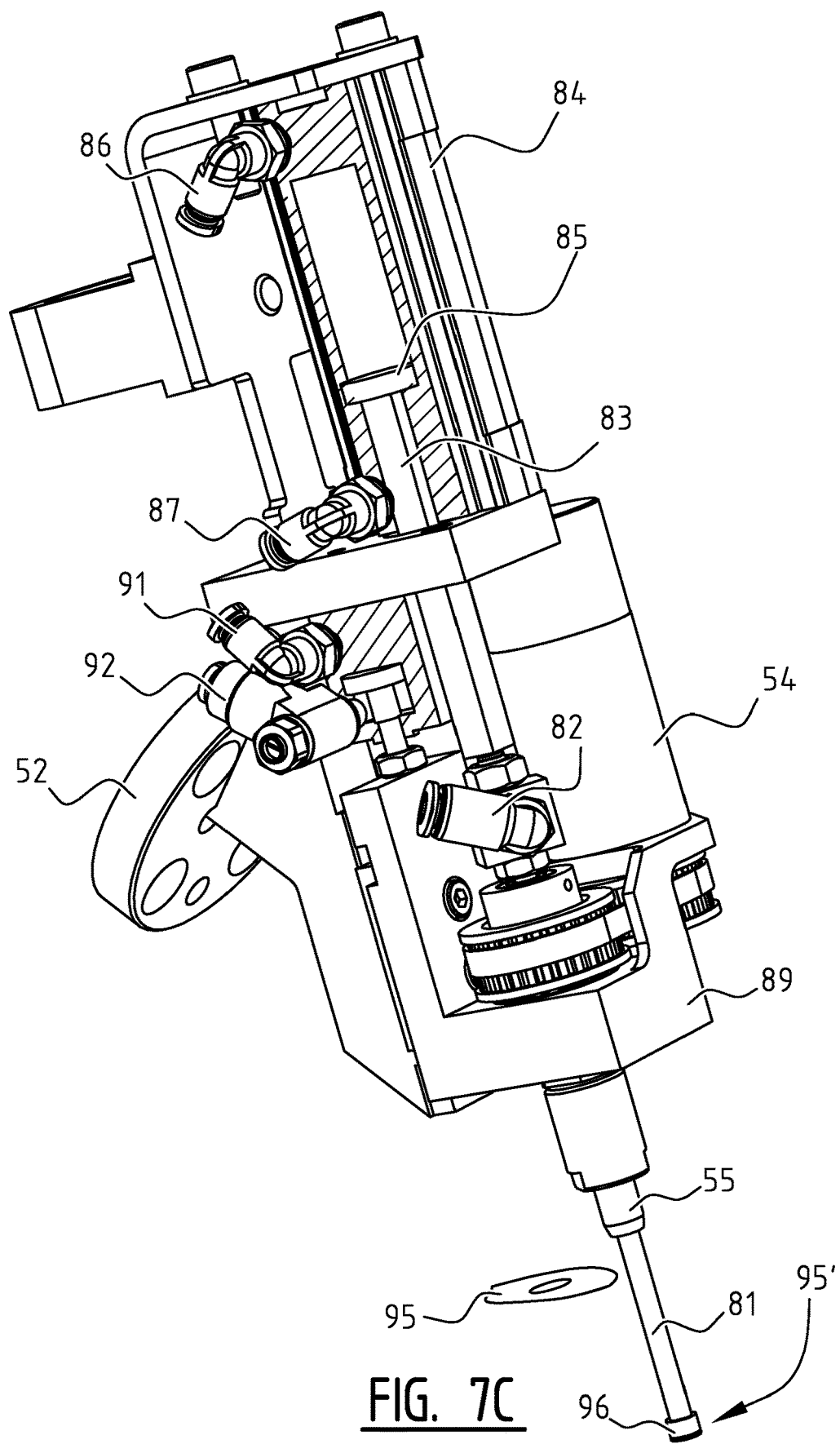

FIGS. 7A-7C illustrate the various configurations of the cutting device. FIG. 7A shows a starting configuration of the cutting device in which hollow cutting element 55 is in a first position in which it is not significantly engaging a leaf 95. In this position, both hollow suction element 81 and hollow cutting element 55 are in their retracted position. To attract leaf 95 against hollow suction element 81, a vacuum is applied at inlet 82. Next, pressurized gas is supplied to inlet 91 relative to inlet 92 for moving carriage 89 and hollow cutting element 55 mounted therein from the first position to a second position in which hollow cutting element 55 can engage leaf 95, see FIG. 7B. Prior to or during the movement between positions, hollow cutting element 55 is actuated by drive unit 54, preferably in such a manner that hollow cutting element 55 has achieved the operational rotational speed prior to engaging leaf 95.

After leaf 95 has been cut, hollow cutting element 55 may move upward again by applying pressurized gas to inlet 92 relative to inlet 91. At the same time, drive unit 54 may stop driving hollow cutting element 55. Preferably, hollow cutting element 55 is operating at the operational rotational speed whenever hollow cutting element 55 is in a position to engage leaf 95.

The cutting device is typically mounted to a robot arm. A vision system can be used to determine an appropriate position for cutting device in order to cut a sample 95' of leaf 95 as described in conjunction with FIG. 1. When this cutting process is finished, the robot arm has to move to a different position where the sample can be delivered for further processing. In some cases, the sample has to be deposited in a narrow elongated vessel. This may be complicated due to the external dimensions of cutting element 55. To solve this problem, pressurized gas may be supplied to inlet 86 relative to inlet 87. Consequently, piston rod 83 and hollow suction element 81 connected thereto will move downward, see FIG. 7C. During all this time, a vacuum is still applied to inlet 82 such that obtained sample 95' is kept against an end of hollow suction element 81. Once positioned at the appropriate position for depositing the sample, pressurized gas can be supplied to inlet 82 to push the sample away from hollow suction element 81. Thereafter, pressurized gas can be supplied to inlet 87 relative to inlet 86 for moving hollow suction element 81 upward to return to the configuration of FIG. 7A.

The present invention is not limited to optical characterization of the leaf to be processed. Other means may be used as a position and orientation capturing unit. Similarly, the image processing unit may be replaced by a general position and orientation determining unit.

In addition, the present invention is not limited to analyzing plants by cutting away samples from a leaf. Other plant parts may be used for the same purpose as long as these parts are sufficiently light and resilient to be attracted using the suction force.

It should be clear to the skilled person that features belonging to different embodiments may be combined to form new or modified embodiments. It should further be apparent to the skilled person that various modifications can be made to the embodiments of the present invention without departing from the scope of the invention which is defined by the appended claims.

The invention claimed is:

1. A cutting system, comprising:
   a cutting device (110) having:
      a hollow cutting element (5) having a cutting edge (18);
      a main body (3) having a cavity in which the hollow cutting element (5) is rotatably received;
      a drive unit (4) for rotating said cutting element (5) about a longitudinal axis of said cutting element, comprising an output shaft (25) that is connected to said hollow cutting element (5), said drive unit (4) being connected to said main body (3); and
      a gas flow direction unit for applying a suction force through the hollow cutting element (5), comprising a conduit (170) which is in fluid communication with the hollow cutting element (5);
   a control unit (180) for controlling the drive unit (4) and the gas flow direction unit;
   wherein the hollow cutting element is elongated and in the control unit (180) is configured to control the gas flow direction unit and the drive unit (4) such that:
      a suction force is applied through the hollow cutting element (5) to attract a leaf of a plant towards the hollow cutting element (5) from one side of the leaf, the other side of the leaf being unsupported;
      the hollow cutting element (4) is rotated to cut through the leaf while maintaining said suction force,
   wherein the main body (3) comprises an opening which is in fluid communication with said cavity and to which the conduit (170) is connected, wherein the hollow cutting element (5) comprises one or more openings to enable the fluid communication between the conduit (170) and the hollow cutting element (5).

2. The cutting system according to claim 1, wherein the control unit (180) is further configured to control the gas flow direction unit and the drive unit (4) to rotate the hollow cutting element (5) to cut through the leaf while keeping the leaf sucked against the hollow cutting element (5) using the suction force, and to rotate the cutting element (5) before it engages the leaf.

3. The cutting system according to claim 2, wherein the cutting device (110) further comprises a pressure sensor (160) to measure pressure in the gas flow direction unit related to the pushing force, wherein the control unit (180) is configured to determine that the cut sample obstructs the hollow cutting element (5) and/or the hollow suction tube when the measured pressure does not drop below a predetermined threshold value after application of the pushing force.

4. The cutting system according to claim 1, wherein the gas flow direction unit is further configured to apply a pushing force through the hollow cutting element (5) to push a cut sample of the leaf away from the cutting device (110).

5. The cutting system according to claim 4, wherein the gas flow direction unit comprises a vacuum unit for generating said suction force and/or a pressurized gas source (150) for generating said pushing force.

6. The cutting system according to claim 5, wherein the gas flow direction unit comprises a valve unit (130) which allows a switching between the pressurized gas source (150) and the vacuum unit to change between an application of the suction force and the pushing force, wherein the control unit (180) is configured to control the valve unit (130), or wherein the valve unit (130) can be operated manually.

7. The system according to claim 6, wherein the control unit (180) is configured to first:
control the valve unit (130) to apply a suction force, move the robot arm (120) to a position wherein the device may obtain a sample from the plant, and control the drive unit (4) to rotate the cutting element (5), and to then:
move the robot arm away (120) from said position and apply a pushing force to push the cut sample away from the device into a container.

8. The cutting system according to claim 4, wherein the control unit (180) is configured to control the third drive unit, and wherein the control unit (180) is configured to, after said leaf has been cut, control the third drive unit to displace the hollow suction element (81) relative to the hollow cutting element (5) and to then control the gas flow direction unit to apply said pushing force to push the cut sample of the leaf away from the device.

9. The cutting system of claim 1, the cutting device (110) further comprising an elongated hollow suction element (81), arranged inside the hollow cutting element (5), through which said suction force is applied.

10. The cutting system of claim 9, wherein the hollow cutting element (5) and the hollow suction element (81) are coaxially arranged, and wherein the hollow cutting element (5) and the hollow suction element (81) are mutually displaceable along their longitudinal axes.

11. The cutting system according to claim 9, the cutting device (110) further comprising a mounting frame (50) on which the hollow cutting element (5) and the hollow suction element (81) are arranged.

12. The cutting system of claim 11, wherein the hollow suction element (81) is rotationally fixed relative to the mounting frame (50), and wherein the hollow cutting element (5) is rotationally mounted on the mounting frame (50).

13. The cutting system of claim 12, wherein the drive unit (4) is arranged spaced apart from the hollow cutting element (5), the cutting device (110) further comprising a transmission (80), such as a belt, between the drive unit (4) and the hollow cutting element (5) to allow the drive unit (4) to rotate the hollow cutting element (5).

14. The cutting system according claim 11, the cutting device (110) further comprising a second drive unit mounted on the mounting frame (50) and being configured to displace the hollow cutting element (5) along its longitudinal axis with respect to the mounting frame (50) between a first free position, in which it does not significantly engage the leaf, to a second position in which the hollow cutting element is able to engage the leaf.

15. The cutting system according to claim 14, wherein the control unit (180) is configured to control the second drive unit, and wherein the control unit (180) is configured to first control the gas flow direction unit to apply said suction force to attract the leaf against the hollow suction element (5) and to then control the second drive unit (54) to displace the hollow cutting element (5) relative to the hollow suction element (81) from the first position to the second position in order to engage the leaf that has been sucked against the hollow suction element (81) and to cut through said leaf.

16. The cutting system according to claim 15, wherein the control unit (180) is configured to control the drive unit (4) to start rotating the hollow cutting element (5) prior to the hollow cutting element (5) reaching the second position.

17. The cutting system according to claim 11, the cutting device (110) further comprising a third drive unit mounted on the mounting frame (50) and being configured to displace the hollow suction element (81) along its longitudinal axis with respect to the mounting frame (50).

18. The cutting system according to claim 1, wherein the output shaft (25) extends through the hollow cutting element (5).

19. The cutting system according to claim 1, wherein the main body (3) and/or the hollow cutting element (5) comprises a radial recess (22) at or near the one or more openings for defining a chamber (24) that extends around the hollow cutting element (5) and which is in fluid communication with said conduit (170).

20. The cutting system according to claim 1, the cutting device (110) further comprising a support element (6), arranged near an end of the cutting element (5) that faces the leaf, and having a supporting surface (6A) perpendicular to the longitudinal axis, said supporting surface (6A) having an opening through which the hollow cutting element extends.

21. The cutting system according to claim 20, wherein the support element (6) is adjustable connected to the main body (3), wherein a distance between the main body (3) and the support element (6) can be adjusted.

22. The cutting system according to claim 1, wherein the hollow cutting element (5) comprises a plurality of separated channels (17) formed near the cutting edge (18).

23. The cutting system according to claim 1, wherein the cutting device (110) further comprises a pressure sensor (160) to measure pressure in the gas flow direction unit related to the suction force, wherein the control unit (180) is configured to determine that a sample of a leaf has been obtained and/or that a leaf has been sucked against the hollow suction tube if the measured pressure drops below a predetermined threshold value, wherein the control unit (180) is configured to control the hollow cutting element (5) and/or the second drive unit in dependence of said determination.

24. The cutting system according to claim 23, wherein the same pressure sensor (160) is used for measuring pressure in the gas flow direction unit related to the pushing force and to the suction force.

\* \* \* \* \*